April 27, 1954     M. F. TURNER     2,676,790
ROCK BIT
Filed Nov. 10, 1948     2 Sheets-Sheet 1
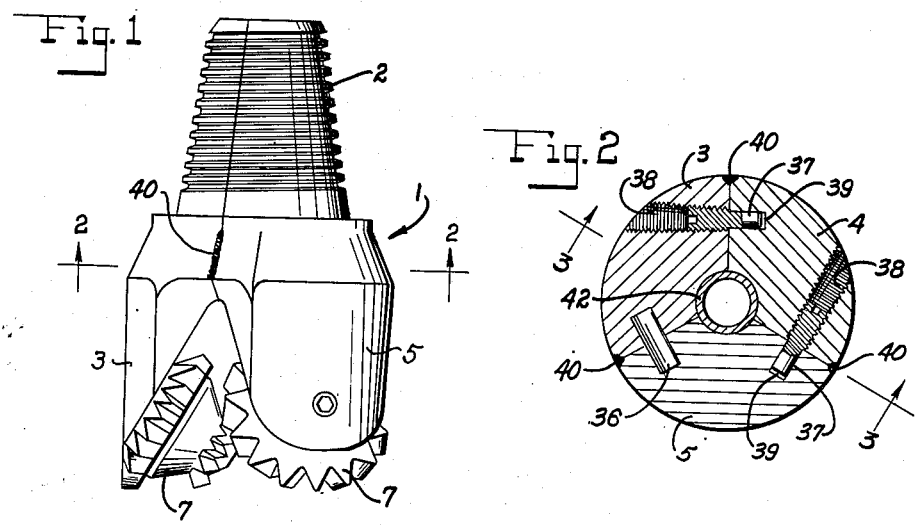
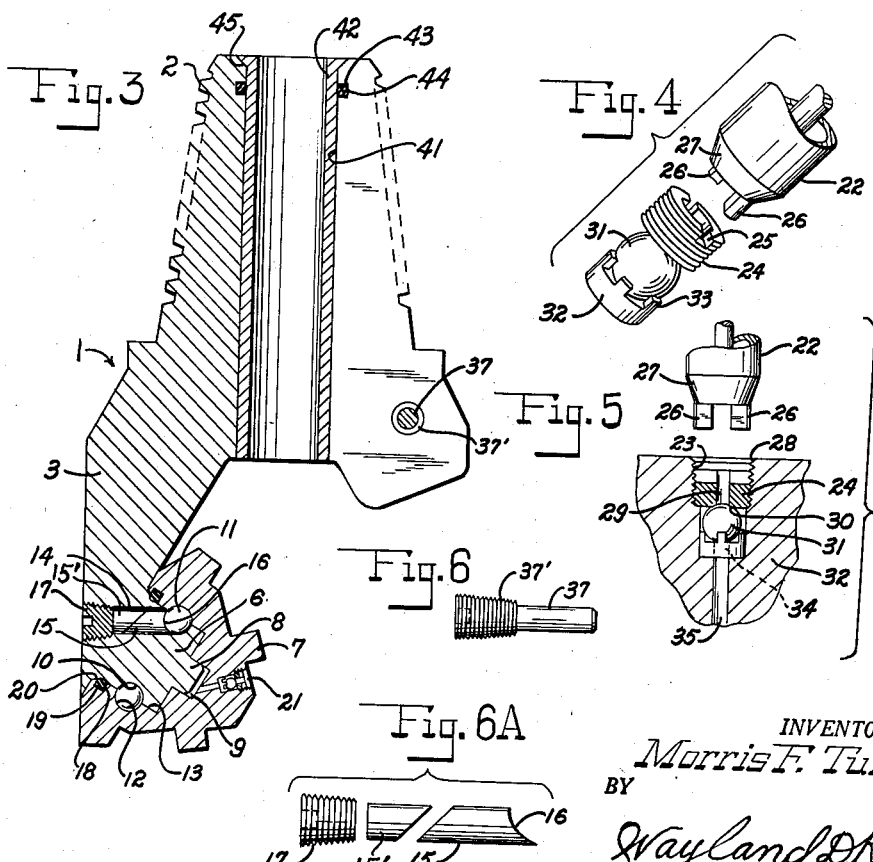
INVENTOR.
Morris F. Turner
BY
Wayland D. Keith
HIS AGENT

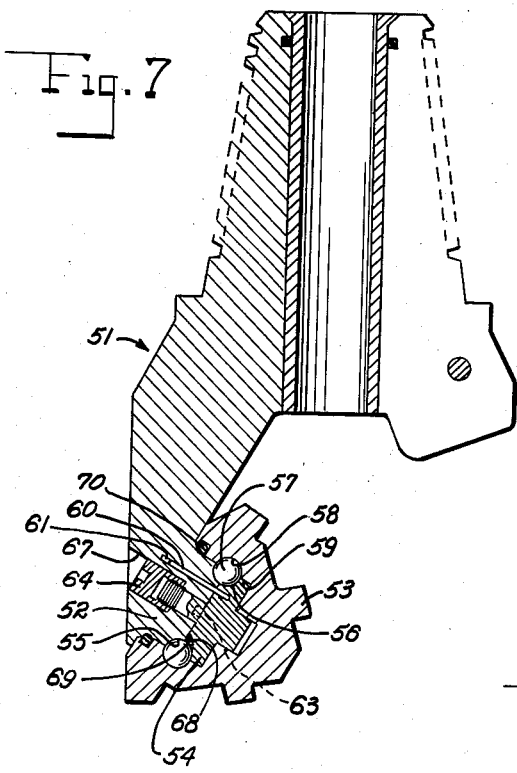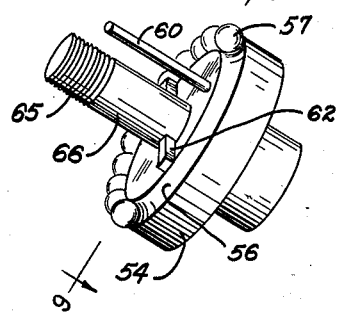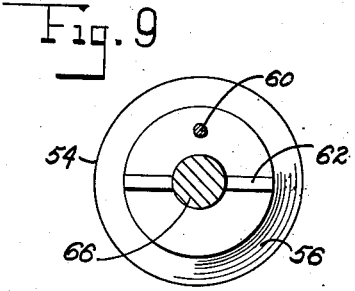

Patented Apr. 27, 1954

2,676,790

UNITED STATES PATENT OFFICE 2,676,790

ROCK BIT

Morris F. Turner, Midland, Tex., assignor to Turner Bits, Inc., Fort Worth, Tex.

Application November 10, 1948, Serial No. 59,298

2 Claims. (Cl. 255—344)

This invention relates to improvements in rock bits and more particularly to rock bits for drilling wells which utilize milling cutters for triturating earth formation by the rolling action of toothed cutters under pressure.

Rock bits have been proposed heretofore, but the manner in which the segments thereof were secured together with dowel pins necessitated the drilling of the holes to receive them in such manner that the segments could not be interlocked, and had to be welded together in order to be retained in operating relation. Such bits have presented certain difficulties in assembly and disassembly, and in the insertion of the bearings. Also, as stated above, the segments could not be interlocked to form a composite cutting unit. The milling cutter shafts of such bits have been inadequate as to sealing means for sealing in the lubricant and excluding the drilling mud and other foreign matter, furthermore, the lubricating means has been inadequate.

The present invention provides a rock bit that is readily assembled and disassembled, which may be readily lubricated, and with provision for retaining the lubrication and excluding the drilling fluid.

The primary object of this invention is to provide a rock bit, the segments of which may be interlocked for operation, but which may be readily assembled and dis-assembled for reconditioning or re-tipping.

Another object of this invention is to provide a rock bit the milling cutters of which have anti-friction bearings that may be readily inserted and removed, and which are sealed with an O-ring to retain the lubricant and exclude the foreign matter.

Another object of this invention is to provide for a rock bit a lubricant fitting which makes possible the insertion of lubricant into and around anti-friction bearings, to enable the packing of the bearing chamber under pressure; and while under pressure, to seal the lubricant chamber against loss of lubricant and to exclude drilling fluid, the pressure of which might exceed the pressure within the lubrication chamber of the bearings.

With these objects in mind, and others that will manifest themselves as the description proceeds, reference is to be had to the accompanying drawings in which:

Fig. 1 is a side elevational view of a rock bit embodying the invention;

Fig. 2 is a sectional view taken on the line 2—2 of Fig. 1, looking in the direction indicated by the arrows;

Fig. 3 is a sectional view taken on the line 3—3 of Fig. 2, looking in the direction indicated by the arrows;

Fig. 4 is an exploded view of the lubrication fitting, and an end portion of a lubrication gun used in conjunction therewith;

Fig. 5 is an enlarged detail view of the lubrication fitting fitted in place, and which shows an end portion of the lubrication gun positioned thereabove;

Fig. 6 is a perspective view of a screw-dowel pin removed from the rock bit;

Fig. 6A is an enlarged, exploded view of the ball retention pin and the coacting parts thereof;

Fig. 7 is a vertical sectional view, similar to Fig. 3, but of a modified form of the invention;

Fig. 8 is a perspective view of a portion of the bearing race removed, and showing the balls positioned in place; and Fig. 9 is a sectional view taken on the line 9—9 of Fig. 8, looking in the direction indicated by the arrows.

With more detailed reference to the drawing, the numeral 1 generally designates a rock bit having a screw threaded pin 2 for connection with the drill stem in the usual manner. The form of the bit, as shown, embodies three segmental parts 3, 4, and 5, which parts are adapted to fit in complementary relation to form a composite body 1. Each of the segments 3, 4 and 5 has a pin 6 protruding inwardly and downwardly therefrom at an angle to receive a toothed milling cutter 7. Each pin 6 has a protruding reduced portion 8 which forms a pilot within the bore 9 of the milling cutter 7, as will best be seen in Fig. 3. The pin 6 has a peripheral groove 10 adapted to receive balls 11 and a complementary annular groove 12 formed within the bore 13 of the milling cutter 7. The grooves 10 and 12 are complementarily formed so that each is approximately half the depth of the ball elements 11, to form a race therefor. An aperture is provided in each of the segments 3, 4, and 5, which aperture is of sufficient size as to permit the insertion of the balls 11 therethrough into the annular race formed by the complementary grooves 10 and 12. The balls 11, when inserted into the race in sufficient numbers, seal the annular race, and lock the milling cutters 7 against longitudinal movement on their respective shafts 6, but permit free rotary movement of the cutters 7.

When the balls 11 are in place, a pin 15 is inserted within hole 14 in the respective segments 3, 4 and 5. The pin 15 has one end contoured at 16 so as to form a part of the raceway, when the pin is in place. The other end of the pin 15 is cut at an acute angle with which a pin portion 15', having a complementarily angularly cut end interfits, so that when the pin 15 and pin portion 15' are inserted within one of the holes 14, and a hollow-head, tapered screw plug 17 is screwed into the hole 14 of each of the bit segments, the pin 15 will be held in correct adjusted position by the wedging engagement of the pins 15 and 15', as will best be seen in Fig. 3. The contoured or grooved portion 16 of the pin 15 will form an uninterrupted ball race 12 for the balls 11, the contour of the end of the pin, when in place, being such that it will conform to the race and become a part thereof.

It is preferable to have the hole 14 slightly larger in diameter than the diameter of the pin 15 and the pin portion 15' so that these pins may be inserted into the hole and guided into proper position by using the angular outer end portion as a guide, and with the pins 15—15' in loose fitting relation with respect to the hole 14, a workman on the job can easily remove the screw plug 17, so that the pins 15—15' will drop out to enable the removal and replacement of the balls 11 within the race formed by the complementary grooves 10 and 12. This makes possible the removal of the bearings, cones, sealing elements from the bit body in a few minutes time at the site of the well, and allow the replacement of the balls and sealing elements by any unskilled workman. And, in event the grooves become worn so as not to give the proper bearing relation, larger balls can be inserted to present a new bearing surface, or the grooves 10 and 12 may be machined or honed so that they will receive larger balls, if this is desirable, which will result in a bearing of the same quality as a new bearing.

It is preferable to have the pins 6 that form the shaft for each of the cones 7 heat treated and hardened, therefore, when it is necessary to "re-tip" the bit with hard surfacing material, to present a hardened bit surface, the cones can be readily removed for this work to be performed so that the heat will not impair the hardness of the shafts.

By having a bit of the construction as set forth herein, it will be appreciated that the bearings and sealing elements can be replaced in a few minutes time without the necessity of using skilled labor, with the result that a bit of exceptional desirability for use in remote places and where the facilities of a machine shop are not obtainable.

By the utilization of a bit of this construction, the entire bit can be assembled and new cones and new bearings inserted in place on the original body, while the worn cones are being reworked.

In bits that are now in general use, the milling cutters or cones are manufactured to make a "one run cut" and after these cones become worn, either the bearings or the teeth or both, they are normally discarded at very great expense. The present bit is designed to be easily and economically rebuilt or repaired on the job in a comparatively short time, with unskilled labor and without the facilities of a machine shop. This greatly expedites the drilling time for a well, as the shut down time is reduced to a minimum.

Each of the cutters 7 has an annular groove 18 therein, which is adapted to receive an annular resilient ring that is round in cross section and is generally known in the trade as an O-ring. The O-ring is of sufficient size as to approximately fill the groove 18, with a slight flattening action on the sides of the O-ring, furthermore, the O-ring is positioned adjacent and in contact relation with an angular surface 20 on the outer end of shaft 6. This angular shoulder is adapted to engage a complementary angular shoulder on milling cutter 7, so that upon wearing of the bearings 11 or other parts, the milling cutter will have a tendency to move outward to seal against the angular shoulder 20.

Upon application of pressure through a lubrication fitting, generally designated at 21, into the bore 9 of the milling cutter, by means of a grease gun indicated at 22, as will be more fully explained hereinafter, the O-ring 19 will be caused to roll and seal against angular shoulder 20 so as to retain the lubricant therein under pressure which will normally exceed the pressure of the drilling fluid in the well or the hydrostatic head exerted thereby. This will prevent the drilling fluid from reacting on the opposite side of the O-ring 19 to force the drilling fluid past the O-ring 19, into the bearing race.

A lubricant fitting 21 is positioned within milling cutter 7, which cutter has a threaded hole 23 therein which is adapted to receive a threaded plug 24 which plug has a transverse slot 25 thereacross adapted to interengage with a pair of prongs 26 on grease gun 22. The lubricant gun 22 has a tapered end 27 adapted to seat on an angular seat 28 of the milling cutter 7 to form a seal between the gun 22 and the threaded hole 23. The screw plug 24 has a passage 29 therethrough and an annular seat 30 on the lower side to seat upon ball 31 so as to form a fluid tight connection therewith. A cage 32, having prongs 33 thereon, is provided to hold the ball a spaced distance above the cage 32 so grease may pass through passage 34 into a passage 35 leading to bore 9 in the milling cutter.

The prongs 26 on the end of grease gun 22 are adapted to interengage with transverse slots 25 and act as a wrench for the turning of the threaded plug 24 to enable loosening of the plug sufficiently to permit grease to pass between seat 30 and the ball 31, thereby enabling the grease to be forced into bore 9 under pressure with the conical part 27 firmly seated on seat 28, and while the grease is still under pressure, enables the turning of the grease gun 22 so as to screw the plug 24 into seating relation with ball 31 so as to retain the grease under pressure, thereby perfecting a perfect, positive seal against leakage of lubricant therefrom, or intrusion of foreign matter thereinto and through the lubricant fitting, after it is filled.

The bit segments 3 and 5, after the milling cutters 7 have been assembled on shaft 6, as hereinbefore described, are fitted on a dowel pin 36, as shown in Fig. 2, and then segment 4 is fitted in place and dowel pins 37 are screwed into place as indicated in Fig. 2. Due to the diverging angular positioning of the dowel pins 36 and 37, after the bit segments 3, 4, and 5 are assembled, the separation thereof without the removal of screw threaded dowel pins 37 is not possible. The screw threaded dowel pins 37 have threads on the socket head portion 37' to engage threaded holes 38 in segments 3 and 4 to enable the dowel pins 37 to be inserted into and removed from holes 39 by means of a conventional wrench, which enables the ready assembly and disassembly of the segments 3, 4 and 5 into a composite bit body 1, as indicated in Fig. 1. If desired, the bit segments 3, 4 and 5 may be tack welded at 40 to provide extra security against separation of the bit segments, although the dowel pins 36 and 37 will hold the bit segments in secure relation under all normal conditions, and make the tack welding normally unnecessary.

After the bit segments are fitted together in the manner as described above, the tool joint 2 is threaded with conventional threads, and, when the bit segments are disassembled or reassembled, the threads will always be in register so as to present a uniform, uninterrupted threaded portion. The tool joint pin 2 will be bored at 41 to receive a wash pipe or tubular liner 42 which directs the drilling fluid therethrough, which will prevent the drilling fluid from passing out between the interfitting faces between the bit segments 3, 4 and 5. An annular groove 43 is formed in the tool joint pin 2 near the upper end of the bore 41 which groove is of such size and shape as to receive an annular O-ring 44 to seal the outer periphery of wash pipe 42 with respect of the inner bore 41 of threaded tool joint pin 2. The upper end of the tubular wash pipe 42 has an out-turned shoulder 45 adapted to interfit with a complementary recess within the end of threaded tool joint pin 2, so as to correctly position wash pipe 42 within bore 41 and prevent it from moving downward and becoming engaged with milling cutter 7.

The bit body being constructed in this manner, in accordance with the description as set forth above, provides a bit that may be readily assembled and disassembled for repair, and it may also be readily lubricated under pressure and will retain this lubrication. The drilling fluid and foreign matter are prevented from passing into the bearings. The drilling fluid is also directed through passage in the tool joint pin 2 without permitting escape thereof through the juncture between the bit segments.

In the modified form of the device, as shown in Figs. 7 to 9, inclusive, the bit body is designated as 51 and has an inwardly and downwardly extending pin 52 adapted to receive a milling cutter 53. A complementary portion 54 forms a pin extension for the pin 52. When the pin extension 54 is fitted into abutting relation with pin 52, grooves 55 and 56, in the pin portion 52 and pin extension 54, respectively form a peripheral groove, the concave portion of which is circular in cross section and is adapted to receive balls 57 in interfitting relation therebetween and between annular groove 58 formed on the inner diameter of a bore 59 in milling cutter 53. The pin extension 54 has dowel pin 60 fitted therein and is adapted to extend into hole 61 within pin 52, as will best be seen in Fig. 7. The pin extension 54 has transverse upstanding lugs 62 adapted to engage complementary transverse recesses 63 on the inner face of pin 52, so as to prevent relative rotary movement therebetween upon the tightening of screw threaded socket head nut 64 which nut engages threads 65 on the outer end of the threaded pin 66. The pin 52 has an axial hole 67 therethrough to receive pin 66 and is counter-bored to receive socket headed nut 64 in shouldered relation to enable the drawing of pin extension 54 into close fitting relation with balls 57 so as to form a bearing race. The pin extension 54 is fitted within milling cutter 53 and the balls 57 are placed within annular groove 58 and groove 56 through notched opening 68 in the raceway formed by grooves 55 and 58 until all of the balls are circumferentially spaced within annular groove 58, at which time a segment 69 is placed in ratchet opening 68.

The dowel pin 60 and threaded pin 66 are inserted into holes 61 and 67 respectively and the pin extension 54 carrying milling cutter 53 is moved into abutting relation with the end of pin 52 so that the transverse rib or lug 62 interfits in complementary relation with transverse groove 63, at which time socket headed nut 64 is screwed onto threaded portion 65 of pin 66 so as to draw pin extension 54 into abutting relation with the end of pin 52. After the balls are in place, a cooperating segment 69 may be interfitted within notch 68 so as to form a smooth and uninterrupted raceway within groove 58 formed within pin extension 54.

With the balls fitted within the race, as above described and held in place by screw threaded socket nut 64, the milling cutter 53 may be readily removed and the O-seal ring removed while the teeth of the milling cutter are retipped, sharpened or heat treated, which process would normally destroy any resilient seal, such as synthetic rubber or the like, that could be placed within the milling cutter. The O-seal ring 70 is provided for sealing relation between the milling cutter 53 and the pin 52 substantially in the manner as described for the form above.

The bore of the milling cutter 53 may be packed with lubricant during assembly, and, when drawn into place by socket head nut 64, the lubricant will be put under pressure due to the fact that O-ring 70 will retain the lubricant while the nut 64 draws the bearing into place, or, if desired, a lubricant fitting, as that described for the form above, may be provided.

It is to be understood that, while the invention has been described in some detail, changes and adaptations may be made in the construction without departing from the scope of the appended claims.

Having thus described the invention, I claim:

1. A rock bit structure comprising a body made up of a plurality of segments, a protruding arm arranged on each of said segments, each arm having a shaft disposed near an end thereof, each of said shafts having a peripherial groove formed therearound, a toothed milling cutter having a bore formed therein adapted to be journaled on each of said shafts, an annular groove formed within the bore of each milling cutter, each of said annular grooves being adapted to register with the peripheral groove of its respective shaft when the milling cutter is positioned on the shaft, each arm having a passage formed therein and leading from the exterior thereof, which passage is adapted to intersect the peripherial groove of the respective shafts, said passage being of a size to permit the insertion of roller elements therethrough and into said peripherial groove in the respective shafts and the respective annular grooves in the milling cutters, said roller elements being adapted to journal each of the said milling cutters to its respective shaft to retain said milling cutters against longitudinal movement thereon, a pin having an arcuate notch formed in an end thereof being provided to interfit in each of said passages in such manner that said notch will form a raceway for said roller elements in said peripherial grooves, the opposite end of said pin having an angular face formed thereon, and a pin having a complementary angular face, which complementary angular face engages the angular face of the first mentioned pin in axial alignment so as to exert a wedging action when pressure is applied to the end opposite said angular face of said last mentioned pin, and a screw element in position to exert axial pressure on the outer end of said second mentioned pin so as to retain said pins within said arms to hold the respective roller elements in adjusted position.

2. A rock bit structure comprising a body made up of a plurality of segments, a protruding arm arranged on each of said segments, each of said arms having a shaft disposed near an end thereof, each of said shafts having an arcuate peripherial groove formed therearound, a toothed milling cutter having a bore formed therein adapted to be journaled on each of said shafts, an arcuate annular groove formed within the bore of each of said toothed milling cutters, each of said arcuate annular grooves being adapted to register with the arcuate peripherial groove of its respective shaft when the milling cutter is positioned on the shaft, each arm having a passage formed therein and leading from the exterior thereof which passage is adapted to intersect the arcuate peripherial groove of the respective shafts, said passage being of a size to permit the insertion of ball elements therethrough and into said arcuate peripherial groove in the respective shafts and the respective arcuate peripherial grooves in the milling cutters, said ball elements being adapted to journal each of said toothed milling cutters to its respective shaft to retain said milling cutter against longitudinal movement thereon, a pin having an arcuate notch formed in an end thereof being provided to interfit into each of said passages in such manner that said notch will form a raceway for said roller elements in said arcuate, peripherial grooves, the opposite end of said pin having an angular face formed thereon, and a pin having a complementary angular face, which complementary angular face engages the angular face of the first mentioned pin in axial alignment so as to exert a wedging action when pressure is applied to the end of the last mentioned pin, and a screw element in position to exert an axial pressure on the outer end of said second mentioned pin so as to retain each of said pins within its respective arm to hold the respective ball elements in adjusted position.

References Cited in the file of this patent

UNITED STATES PATENTS

| Number | Name | Date |
| --- | --- | --- |
| 1,729,063 | Bull | Sept. 24, 1929 |
| 1,896,231 | Fletcher | Feb. 7, 1933 |
| 1,905,079 | Wellensiek et al. | Apr. 25, 1933 |
| 1,983,316 | Scott et al. | Dec. 4, 1934 |
| 1,999,447 | Dodge | Apr. 30, 1935 |
| 2,004,013 | Reed | June 4, 1935 |
| 2,009,299 | Reed | July 23, 1935 |
| 2,039,551 | Phipps | May 5, 1936 |
| 2,047,113 | Reed | July 7, 1936 |
| 2,061,933 | Crum | Nov. 24, 1936 |
| 2,075,997 | Reed | Apr. 6, 1937 |
| 2,094,856 | Smith et al. | Oct. 5, 1937 |
| 2,104,819 | Schlumpf et al. | Jan. 11, 1938 |
| 2,126,035 | Reed | Aug. 9, 1938 |
| 2,168,640 | Abegg | Aug. 8, 1939 |
| 2,171,057 | Crum | Aug. 29, 1939 |
| 2,174,102 | Catland | Sept. 26, 1939 |
| 2,187,037 | Kirkpatrick | Jan. 16, 1940 |
| 2,190,365 | Maxwell | Feb. 13, 1940 |
| 2,283,312 | Boice | May 19, 1942 |
| 2,329,751 | Fermier | Sept. 21, 1943 |
| 2,334,359 | Stancliff | Nov. 16, 1943 |
| 2,470,419 | Voytech | May 17, 1949 |
| 2,512,148 | Gaines | June 20, 1950 |